Oct. 13, 1970    P. A. GARTAGANIS ET AL    3,533,883
APPARATUS FOR MAKING SPIRALLY WOUND COMPOSITE CONTAINER
Filed May 3, 1968
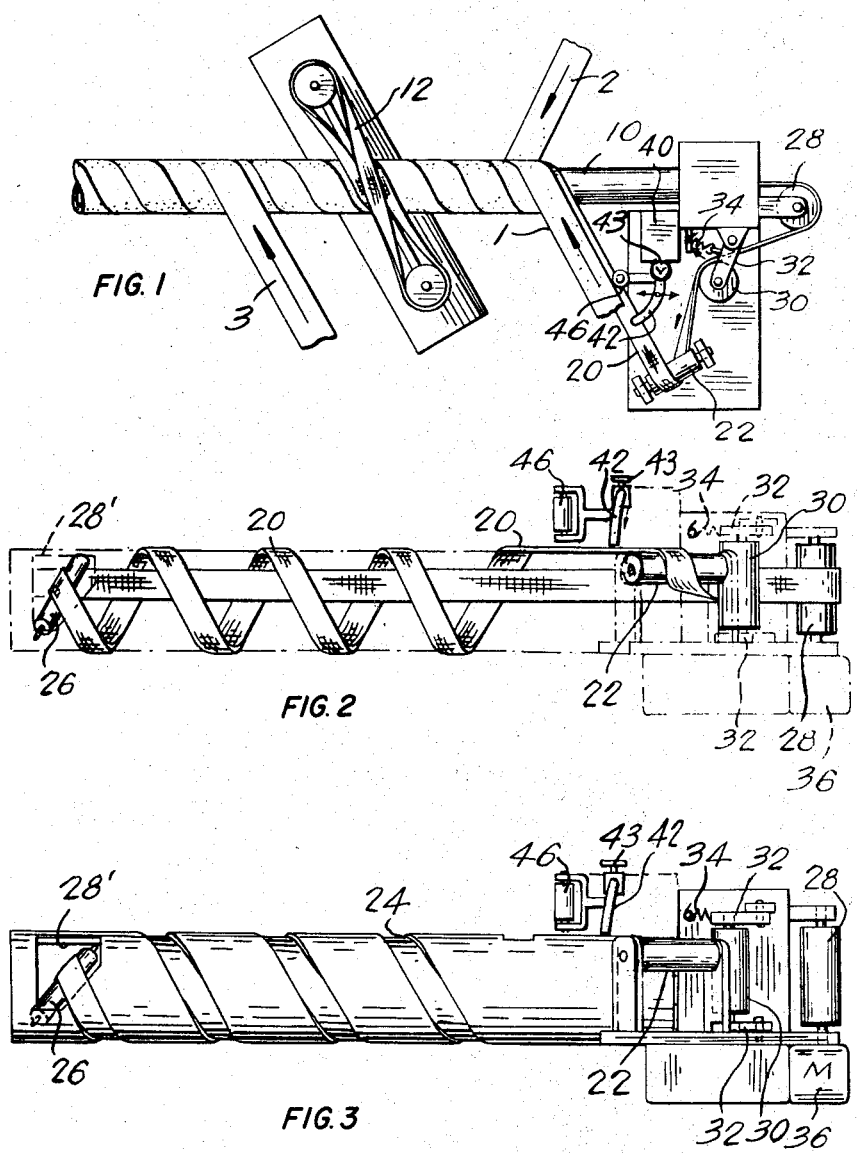
INVENTORS
Pheobus A. GARTAGANIS
Cecil A. ROWLEY
PATENT AGENT

3,533,883
APPARATUS FOR MAKING SPIRALLY WOUND COMPOSITE CONTAINERS
Pheobus A. Gartaganis, Beaconsfield, Quebec, and Cecil A. Rowley, Pointe Claire, Quebec, Canada, assignors to Domtar Limited, Montreal, Quebec, Canada, a company of Canada
Filed May 3, 1968, Ser. No. 726,482
Int. Cl. B65h 81/08
U.S. Cl. 156—432                                7 Claims

ABSTRACT OF THE DISCLOSURE

The present invention relates to sealing of the inside joint on a spirally wound composite container by applying the sealant onto a continuous looped belt travelling in a helix around the forming mandrel and transferring the sealant from the belt to the inside joint as the container is wound on the mandrel.

---

The present invention relates to an apparatus for winding of helically wound composite tubes, more particularly the present invention relates to a method and apparatus for applying a sealant to the inner helical joint on a composite container as the container is being formed.

Different techniques have been proposed for sealing the inner joint of composite containers for fluid. The most practiced commercial methods of sealing the inner joint is by the formation of a lap joint in which two impervious layers are directly sealed together or by the use of a fluid impervious tape covering a butt joint. Some of the other proposed methods include building up a flattened bead to extend laterally from a side edge of the innermost layer of the composite container while using a slip sheet to prevent sticking of the bead to the mandrel and causing this bead to overlap the other edge of the layer and seal the joint (see Canadian Pat. 642,351 issued July 5, 1962) or alternatively, the extrusion of sealant directly into the butt joint by an extruder located within the mandrel (see British Pat. 951,341 published Mar. 4, 1964). The first three systems referred to above require extra material either to form the lap joint or in the tape covering the butt joint or as a slip sheet to prevent the bead of adhesive from adhering to the mandrel. The extrusion method may lead to difficulties with adhesive sticking to and gumming up the mandrel.

It is thus the main object of the present invention to provide an improved apparatus and method for sealing the inner helical joint on a composite container. The present invention is particularly applicable to composite containers having butt joints.

Broadly, the present invention comprises a winding apparatus including a hollow mandrel, a continuous flexible belt wrapped in a helical path about said mandrel, means to direct said belt onto said mandrel and means to return said belt through said hollow mandrel and back to said means to direct whereby said continuous flexible belt travels in a loop from said means to direct along said helical path and back to said means to direct. The present invention also comprises a method of applying a sealant to the inner joint of a composite helically wound container comprising: feeding a continuous looped flexible belt in a helical path about a mandrel and returning same through said mandrel, applying a strip of sealant onto the exposed surface of said belt as said belt is fed to said helical path, winding a layer of material onto said mandrel with the side edges of said material overlying said belt as said belt travels along said helical path thereby to apply said sealant to said edges and seal a joint formed at the junction of said edges, setting said adhesive and separating said belt from said layer and said sealant and returning said belt to said helical path by passing same through said mandrel.

Further features, objects and advantages will be evident from the following detailed description taken in conjunction with the accompanying drawings in which:

FIG. 1 is a schematic plan view of a winding apparatus with parts omitted for clarity.

FIG. 2 is a partial side elevation showing the path of the belt in solid lines and the mandrel in phantom lines.

FIG. 3 is a partial side elevation view with the tape omitted and illustrating the structure of the mandrel.

The present invention utilizes a conventional winding mechanism and therefore the description of this mechanism will be held to a minimum. As shown in FIG. 1, the body plies 1 and 2 are helically wound onto and wrapped tightly about the mandrel 10 by a compression belt 12 wrapped around the mandrel and driven by any suitable means. Subsequent to the belt, sometimes an outer ply 3, generally a label ply is wound onto the tube.

The present invention is concerned with a continuous belt 20 formed of flexible material and from which the sealant sealing the inner joint of the wound tube may be readily separated (for example polytetrafluoroethylene, silicone coated nylon, or other suitable material). The belt 20 is wrapped in a helical pattern about the periphery of the hollow mandrel 10 and then is turned and runs axially within the hollow mandrel towards the fixed end of same. In the illustrated embodiment the belt 20 is directed tangentially onto the periphery of the mandrel 10 at the required angle to the axis of the mandrel by the roll 22. The belt then travels in a helical path around the periphery of the mandrel and is preferably confined on said helical path by means of a suitable helical groove 24 cut into the surface of the mandrel and in which the belt travels. An aperture 28 is provided through the mandrel 10 and a turning roll 26 is mounted to rotate at an angle to the axis of the mandrel and direct the belt axially of the mandrel. In the illustrated embodiment the roller 26 rotates on an axis extending at approximately 45° to the horizontal (the axis of the mandrel being horizontal) and in a vertical plane extending at approximately 45° to the axis of the mandrel. The specific orientation of the rolls 22 and 26 depend on the geometry of the mandrel, helix angle etc. The belt leaves the groove 24 and passes into the interior of the mandrel through the aperture 28' and is wrapped around the roll 26 or similar turning device which directs the belt axially of the mandrel. The belt 20 after leaving the roll 26 travels axially along the interior of the mandrel and out through the fixed end of same and is then directed back to the roll 22 by means of a pair of turning rolls 28 and 30 mounted in suitable support means shown schematically in the drawings. The roll 30 is mounted on pivoted arms 32 which are biased by spring 34 to maintain the proper tension in the belt 20.

The belt 20 may be driven by an electric motor 36 or the like connected to and driving the roll 28, or it may in some cases be driven by frictional contact between the belt 20 and the inner ply 1 of the tube being made. The groove 24 is not quite as deep as the thickness of the belt 20 so that the belt 20 protrudes very slightly above the surface of the mandrel and frictionally contacts and is drawn along by the ply 1. In the latter case the belt will travel at substantially the same speed as the ply 1, while in the case where the belt is driven via the roller 28 the speed of the belt may be regulated to be the same, faster or slower than the ply 1. By varying the speed of the belt 20 a wiping action can be obtained and the thickness of the sealant applied may, to some extent, be controlled.

In certain applications and where a thin belt is used the groove 24 may not be required.

A suitable sealant applicator having a reservoir 40 delivers sealant via a tube 42 onto the belt 20. A valve 44 may be adjusted to regulate the amount of sealant applied. The end of tube 42 may be positioned relative to the belt 20 by a suitable mechanism such as that schematically illustrated at 46 which senses the position of the edge of web 1 and positions the tube 42 accordingly. The belt 20 must of course be wide enough to permit such adjustment and prevent sealant from sticking to the mandrel.

When operating the above described apparatus in accordance with the method of the present invention a suitable sealant such as hot melt or the like is extruded from the pipe 42 onto the upper surface of the belt 20 between the roll 22 and the mandrel 10. The web 1 is then laid onto the mandrel 10 with the edge of the web overlapping the belt 20 and the extruded strip of sealant so that the sealant overlaps the edge of the web. The web 1 is then wound around the mandrel in a helical path conforming to that of the belt thus forming a tube and the sealant on the belt is carried around the mandrel and into contact with the other edge of the web to seal the joint formed between the two edges of the web 1. After the sealant has set and is secured to the edges of the web 1 to seal the joint, the belt 20 is separated from the web and returned along the interior of the mandrel back to the roll 22 in the manner described above. The sealant thus first adheres to, and is carried by, the belt 20 into the butt joint where the sealant adheres to the web 1, sets and is separated from the belt 20 by moving the belt into the mandrel. The belt 20 thus acts as both a carrier and a shield for the sealant until there is no danger of the sealant sticking to the mandrel.

Thus there has been disclosed one method and apparatus for carrying out the instant invention. Modifications may be made without departing from the spirit of the invention as defined in the appended claims, for example, the roll 22 may be taken from within the mandrel and be mounted beyond the free end of same thus eliminating the requirement for the peripheral hole 28' and similarly the turning roll 28 may be moved within the mandrel and the belt fed laterally through an aperture in the mandrel.

What is claimed is:

1. An apparatus for winding helically wound tubes comprising a hollow mandrel, a continuous flexible belt wrapped in a helical path about said mandrel, means to direct said belt onto said mandrel and means to return said belt through said hollow mandrel back to said means to direct, whereby said continuous flexible belt travels in a loop from said means to direct along said helical path and through said hollow mandrel back to said means to direct, means to wind a web of material onto said mandrel to form a tube having an inner joint with said inner joint overlying said belt, and means to supply a strip of sealant onto said belt as said belt approaches said mandrel whereby said sealant will be applied to said joint.

2. A winding apparatus as defined in claim 1 further comprising a helical groove in the peripheral surface of said mandrel, said belt travelling in and being guided by said groove.

3. A winding apparatus as defined in claim 2 wherein the depth of said helical groove is less than the thickness of said belt whereby said belt projects above said peripheral surface.

4. A winding apparatus as defined in claim 1 wherein separate drive means are provided to drive said belt.

5. An apparatus as defined in claim 1 further comprising means to position said strip of sealant on said belt in accordance with the position of an edge of said web.

6. An apparatus as defined in claim 4 further comprising means to position said strip of sealant on said belt in accordance with the position of an edge of said web.

7. An apparatus as defined in claim 2 wherein separate drive means are provided to drive said belt and further comprising means to position said strip on said belt in accordance with the position of an edge of said web.

References Cited

UNITED STATES PATENTS

| | | | |
|---|---|---|---|
| 2,130,355 | 9/1938 | Magill | 156—195 X |
| 2,516,242 | 7/1950 | Munger | 156—191 X |
| 2,586,171 | 2/1952 | McMahon | 156—187 X |
| 3,126,306 | 3/1964 | Sherman | 156—392 X |
| 3,200,022 | 8/1965 | Matton | 156—432 X |
| 3,374,132 | 3/1968 | Boggs | 156—432 X |

CARL D. QUARFORTH, Primary Examiner

G. SOLYST, Assistant Examiner

U.S. Cl. X.R.

156—188, 195